Patented Mar. 21, 1939

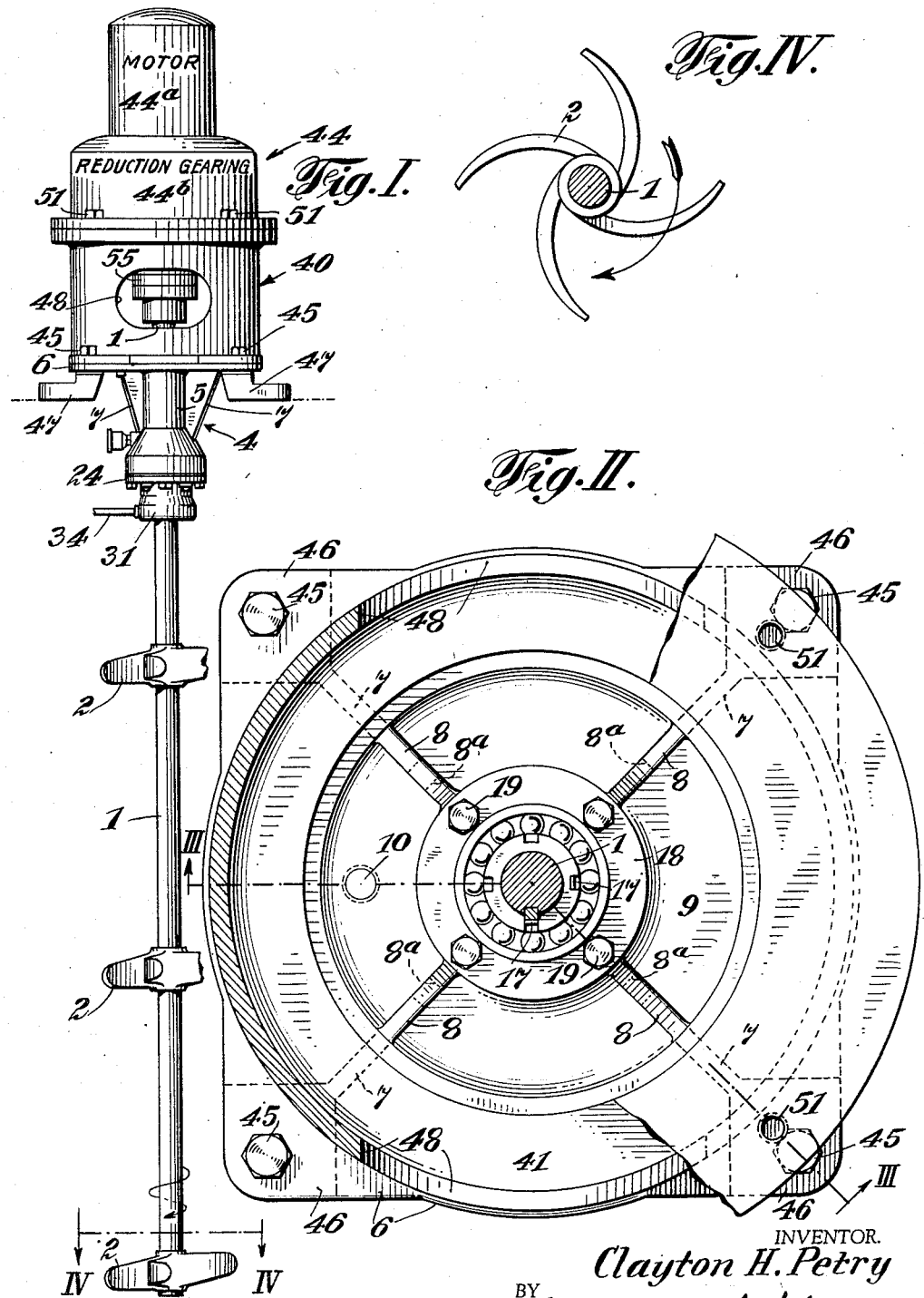

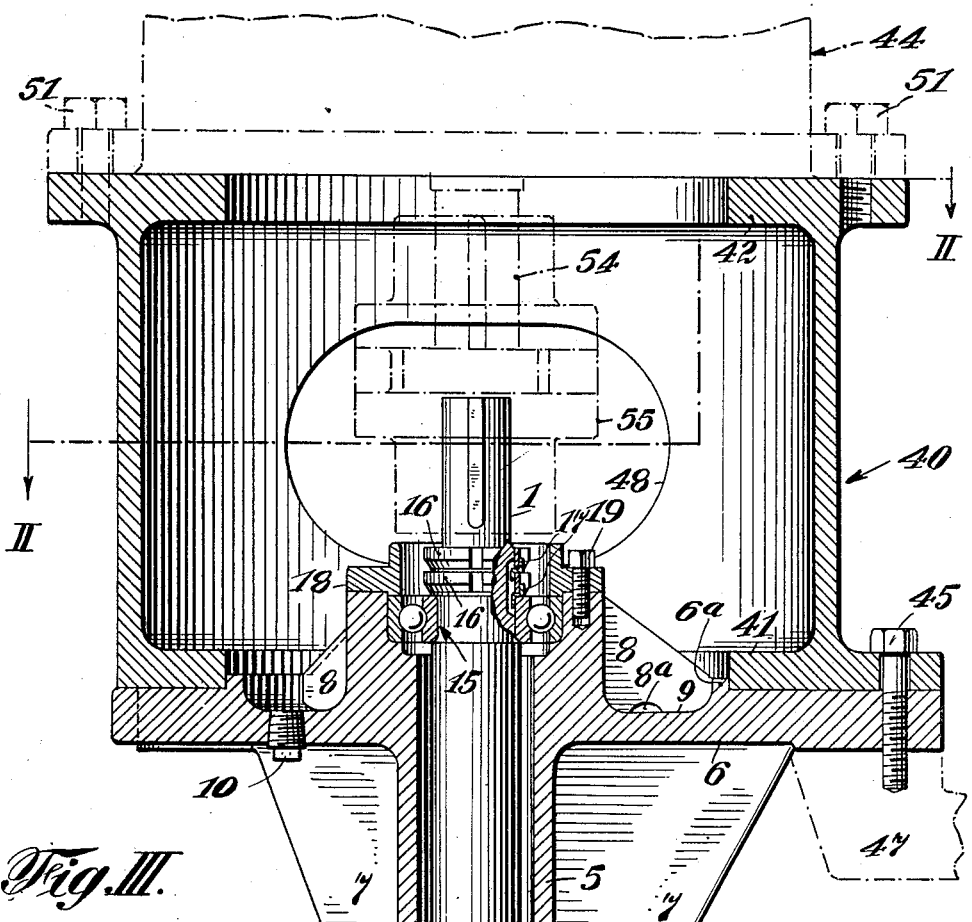
Fig. III

2,151,146

UNITED STATES PATENT OFFICE 2,151,146

MIXING APPARATUS

Clayton H. Petry, New York, N. Y., assignor to The Turbo-Mixer Corporation, New York, N. Y., a corporation of New York Application November 16, 1935, Serial No. 50,141

11 Claims. (Cl. 64—1)

This invention relates to mixing apparatus and more particularly to a construction for supporting and driving one or more mixing impellers.

Mixing apparatus is used for such a wide variety of industrial purposes that manufacturers of the apparatus are called upon to meet an exceedingly wide range of specifications. In some mixing operations shaft bearings within the tank cannot be permitted, for various reasons including abrasive action and the undesirability of bearing metals in contact with the mix; yet a long shaft, equipped with several heavy impellers, may be required. When large heavy impellers are called for, the mixing shaft and bearings must be correspondingly large; but the power requirements may be large or small, depending upon the impeller speed and the viscosity of the mix. The mixing apparatus has a long life and only one or two units may be called for under any one set of specifications. These considerations make it highly desirable for the manufacturer to have apparatus which can be economically constructed to meet any of a wide variety of combinations of (a) mixing shaft speed, (b) length of shaft and number of impellers, (c) shaft size and impeller weight, and (d) shaft driving power.

An object of the present invention is to provide an improved structure for driving a mixing shaft and adequately supporting the same without shaft guides or bearings located within the mixing tank.

Another object of the invention is to provide a mixing construction which permits adequate lubrication of bearing surfaces and provides effective arrest of fugitive lubricant which might have a tendency to enter the mixing tank.

Another object of the invention is to provide a construction for supporting and driving a mixing shaft; which construction lends itself to flexibility in design to obtain varying combinations of shaft size, shaft length, shaft speed, and driving power.

Fig. I is a more or less diagrammatic elevation of a mixing shaft and drive embodying the present invention.

Fig. II is a plan view, partially in section, showing primarily part of the shaft support and an adapter which supports a driving unit. The view is taken approximately on the line II—II of Fig. III.

Fig. III is a vertical section taken approximately on the line III—III of Fig. II. The view shows the shaft support and the adapter for supporting the driving unit.

Fig. IV is a section on the line IV—IV of Fig. I.

A mixing shaft 1, carrying one or more mixing impellers 2, is adapted to depend within a mixing tank (not shown); and the shaft is supported at its upper end by a supporting structure designated as a whole by 4. The support 4 consists essentially of a single metal casting having a tubular portion 5 which projects above and below a flange portion 6. Gussets 7 (four shown) are positioned beneath the flange 6 to add strength and rigidity, and other gussets as 8 (also four shown) are positioned above the flange 6 for a similar purpose. The upper face of the flange 6 is so formed as to provide an annular lubricant reservoir 9 which is adapted to collect the fugitive lubricant from some of the bearings of the organization. A drain plug 10 permits the reservoir to be drained as required; and the gussets 8 are preferably pierced as at 8ª to permit the entire contents of the reservoir to reach the drain hole. Surrounding the reservoir 9 is an upstanding ring 6ª.

A thrust bearing, designated as a whole by 15, is mounted in the upper end of tubular portion 5; and a second bearing, designated as a whole by 20, is positioned in the lower end of tubular portion 5. The inner race of bearing 15 is locked to shaft 1 by lock nuts 16, 16 and lock washers 17, 17. The outer race of bearing 15 is secured to the supporting structure by clamping ring 18, held by suitable means such as cap screws 19. Bearing 20 is secured to the shaft by locking ring 21, which eccentrically engages the inner member 20ª of the bearing 20 and takes a locking hold upon the member 20ª when suitably rotated with respect thereto. After the locking ring 21 has been rotated to locking position, it is secured in place by a set screw 22. Various assembly procedures are possible, e. g., bearing 15 may be clamped in place by ring 18, bearing 20 clamped to shaft 1 at the proper position thereon, and then the shaft may be telescoped upwardly through bearing 15 and nuts 16, 16 applied with lock washers 17, 17.

The lower end of tubular portion 5 is closed by an annular closure 24, sealed by a gasket 25, and held in place by cap screws such as 26. The closure 24 is arranged to be spaced slightly from the races of bearing 20 to allow for slight vertical movement of the bearing 20 upon expansion and contraction of the shaft 1 due to temperature changes. A grease cup 27 provides lubrication for both of bearings 15 and 20.

Formed in the bottom of closure 24 is an annular space to receive packing 23, adapted to be compressed by pressure member 28, secured by means such as screws 29. Affixed to the closure 24 by screws 30 is a reservoir 31 adapted to receive fugitive lubricant creeping down the shaft 1. A disc 32 is brazed, welded or otherwise suitably secured to the shaft 1 and serves to sling into the reservoir 31 any lubricant creeping down the shaft. The reservoir 31 may be drained in any suitable way as by drain pipe 34 which may lead to a discharge point located outside of the mixing tank.

Detachably mounted on flange 6 is a hollow adapter designated as a whole by 40. This adapter has a lower flange 41 which seats on the supporting flange 6 in telescopic relation with ring 6ª. The adapter also has an upper flange 42 adapted to support a drive unit designated as a whole by 44. Adapter 40 may be secured to flange 6 by four bolts 45 which pass into corner portions 46 (see Fig. II) of the flange 6; and in some instances the bolts 45 may be cap screws threaded into flange 6. The corner portions 46 are formed with flat bottoms adapted to cooperate with separate supporting arms 47 which may be used in mounting the structure on a tank. With such mounting, bolts 45 may pass through flange 6, as shown, and enter the arms 47, thus securing together parts 6, 41 and 47. Access to the interior of adapter 40 may be had through oppositely positioned oval holes 48.

The drive unit 44 may be of any suitable type and may include a vertical driving motor 44ª and a reduction gear unit 44ᵇ. Such vertical motors, with built-in gear units, are available on the market to meet a very wide range of speed and power requirements. As shown, the drive is secured by cap screws 51 to the upper flange of the adapter; and the drive has a driving shaft 54 which depends in at least approximate alignment with shaft 1. Connection between the shaft 54 and the shaft 1 is made by any suitable type of coupling 55. Preferably this coupling 55 is of a "flexible" type, thus eliminating the necessity for accurate alignment between shafts 54 and 1.

With a very few standardized sizes and designs of supports 4 and several standardized sizes of adapters 40, the mixer manufacturer can meet a very wide range of mixer specifications. The standardized designs of shaft supports 4 take care of the requirements of shaft size and length of shaft. Open market purchasers of drive units 44 take care of the speed and power requirements. And the few standardized adapters 40 permit the required drive to be assembled with the required shaft support 4.

In compliance with the patent statutes, I have disclosed the best form in which I have contemplated applying my invention, but the disclosure is to be considered as illustrative and not as limiting the scope of the claims.

What is claimed is:

1. The combination of: a unit embodying an impeller shaft support and a vertical impeller shaft passing through and extending beyond the bottom and top of said support, a driving member supported above said shaft support in substantial axial alignment with said impeller shaft, and a flexible coupling connecting the driving member with the upper end of the impeller shaft, said support having vertically spaced bearings for said impeller shaft, the upper of said bearings restraining the upper end of said shaft against longitudinal movement in either direction relative to said support so that longitudinal stresses set up in the impeller shaft are not communicated to the driving member, the lower of said bearings permitting limited longitudinal movement of part of said shaft.

2. The combination of: a unit embodying an impeller shaft support and a vertical impeller shaft passing through and extending beyond the bottom and top of said support, a housing for a driving member above said shaft support and having a driving member in substantial axial alignment with said impeller shaft, an adapter housing interposed between and connecting said unit and said driving member housing, and a coupling connecting the driving member with the upper end of the impeller shaft, said shaft support having vertically spaced bearings for said impeller shaft, said shaft having its upper end held against longitudinal movement in either direction relative to said shaft support so that longitudinal stresses set up in the impeller shaft are not communicated to the driving member, said unit being interchangeable with units having impeller shafts of different characteristics.

3. The combination of: a unit embodying an impeller shaft support and a vertical impeller shaft passing through and extending beyond the top and a considerable distance below the bottom of said support, a driving member supported above said shaft support in substantial axial alignment with said impeller shaft, a flexible coupling between the driving member and the upper end of the impeller shaft, and vertically spaced bearings in said support comprising the sole support for said impeller shaft, said shaft having its upper end held against longitudinal movement in either direction relative to said shaft support so that longitudinal stresses set up in the impeller shaft are not communicated to the driving member.

4. The combination of: a unit embodying an impeller shaft support and a vertical impeller shaft passing through and extending beyond the top and a considerable distance below the bottom of said support, a driving member supported above said shaft support in substantial axial alignment with said impeller shaft, a flexible coupling connecting the driving member with the upper end of the impeller shaft, and vertically spaced bearings in said support comprising the sole support for said impeller shaft, said shaft having its upper end held against longitudinal movement in either direction relative to said shaft support so that longitudinal stresses set up in the impeller shaft are not communicated to the driving member, said unit being interchangeable with other units so that shafts of different characteristics can be driven by said driving member.

5. In mixing apparatus of the type in which rotary mixing means is suspended in a tank of liquid by a vertical mixing shaft that is rotated by a source of power located above the liquid, an improved organization for rigidly mounting the mixing shaft and rotating the same, said organization comprising: a stationary metal support having a stationary vertical tubular portion and a stationary flange portion surrounding the tubular portion; a plurality of vertically spaced bearings carried by said tubular portion and positioned above the upper level of the liquid and out of contact therewith, the mixing shaft depending from said tubular portion into the liquid and being supported and guided solely by said bearings; a hollow adapter detachably mounted on said flange portion; a vertical motor detachably mounted on the adapter; and a flexible coupling within the adapter, the coupling making driving connection between the motor and the mixing shaft.

6. In mixing apparatus of the type in which rotary mixing means is suspended in a tank of liquid by a vertical mixing shaft that is rotated by a source of power located above the liquid, an improved organization for rigidly mounting the mixing shaft and rotating the same, said organization comprising: a stationary metal support having a stationary vertical tubular portion and a stationary flange portion surrounding the tubular portion, said support including strengthening gussets connected with the tubular portion and also with the bottom of the flange portion, the top of the flange portion being formed to provide an annular reservoir to collect fugitive lubricant; a plurality of vertically spaced bearings carried by said tubular portion and positioned above the upper level of the liquid and out of contact therewith, the mixing shaft depending from said tubular portion into the liquid and being supported and guided solely by said bearings; a hollow adapter detachably mounted on said flange portion; a vertical gear head motor detachably mounted on the adapter; and a flexible coupling within the adapter, the coupling making driving connection between the motor and the mixing shaft.

7. In mixing apparatus of the type in which rotary mixing means is suspended in a tank of liquid by a vertical mixing shaft that is rotated by a source of power located above the liquid, an improved organization for rigidly mounting the mixing shaft and rotating the same, said organization comprising: a stationary metal support having a stationary vertical tubular portion and a stationary horizontal portion surrounding the tubular portion, the tubular portion projecting above and below the horizontal portion; a thrust bearing mounted adjacent to the upper end of said tubular portion and a second bearing mounted adjacent to the lower end of said tubular portion, both of said bearings being positioned above the upper level of the liquid and out of contact therewith, and the mixing shaft depending from said tubular portion and being supported and guided solely by said bearings; a hollow adapter detachably mounted on said horizontal portion; a vertical motor detachably supported by the adapter; and a flexible coupling within the adapter, the coupling making driving connection from the motor to the mixing shaft.

8. In mixing apparatus of the type in which rotary mixing means is suspended in a tank of liquid by a vertical mixing shaft that is rotated by a source of power located above the liquid, an improved organization for rigidly mounting the mixing shaft and rotating the same, said organization comprising: a stationary metal support having a stationary vertical tubular portion and a stationary horizontal flange portion surrounding the tubular portion, the tubular portion projecting above and below the flange portion; a thrust bearing mounted within the upper end of said tubular portion and a second bearing mounted within the lower end of said tubular portion, both of said bearings being positioned above the upper level of the liquid and out of contact therewith, and the mixing shaft depending from said tubular portion into the liquid and being supported and guided by said bearings; an originally-separate hollow adapter mounted on said flange portion; a vertical motor mounted on the adapter; and a driving connection from the motor to the mixing shaft.

9. In mixing apparatus of the type in which rotary mixing means is suspended in a tank of liquid by a vertical shaft that is rotated and supported solely by means located above the liquid; an improved structure for rigidly mounting said shaft for rotation, said structure comprising: a one-piece metal casting having a stationary vertical tubular portion with bearing seats adjacent to its upper and lower ends, mounting and supporting means for said structure in the form of an integral horizontal flange portion surrounding said tubular portion between its ends, integral gussets connecting the bottom of said flange portion with the depending part of said tubular portion, and other integral gussets connecting the top of said flange portion with the upwardly projecting part of said tubular portion.

10. In mixing apparatus of the type in which rotary mixing means is suspended in a tank of liquid by a vertical shaft that is rotated and supported solely by means located above the liquid; an improved structure for rigidly mounting said shaft for rotation, said structure comprising: a metal shaft-support having a stationary vertical tubular portion with bearing seats adjacent to its upper and lower ends, mounting and supporting means included in said shaft-support and being in the form of a horizontal flange portion surrounding said tubular portion, and integral gussets connecting said flange portion with said tubular portion; said shaft extending upwardly through said tubular portion and projecting above its upper end; and a pair of bearings each of which has rolling bodies between inner and outer races, one of said bearings being a thrust bearing seated on the upper of said seats and securing the upper end of said shaft against longitudinal movement, and the other of said bearings having its inner race secured to said shaft and its outer race longitudinally slidable in the lower of said seats to allow for expansion and contraction of the shaft caused by temperature changes.

11. In mixing apparatus of the type in which rotary mixing means is suspended in a tank of liquid by a vertical mixing shaft that is rotated by a source of power located above the liquid, an improved organization for rigidly mounting the mixing shaft and rotating the same, said organization comprising: an electric-motor-and-reduction-gear unit, a shaft-support spaced below said unit and substantially coaxially therewith, the mixing shaft depending from said support and being supported and guided solely by bearings in said support, said shaft projecting upwardly from said support and one of said bearings securing the upper end of the shaft against longitudinal movement in either direction, an adapter housing interposed between said unit and said support to secure the two together, said adapter being cooperable with shaft-supports for different sized shafts and with motor-and-gear units having different powers and speeds, and a coupling within the adapter housing operatively connecting said mixing shaft with said unit.

CLAYTON H. PETRY.